United States Patent
Prasad et al.

(10) Patent No.: US 11,586,368 B1
(45) Date of Patent: Feb. 21, 2023

(54) CONFIGURING UNUSED SCM MEMORY SPACE TO SUPPORT NAMESPACES BASED ON IO PATTERNS

(71) Applicant: EMC IP Holding Company LLC, Hopkinton, MA (US)

(72) Inventors: Parmeshwr Prasad, Bangalore (IN); Bing Liu, Tianjin (CN); Rahul Deo Vishwakarma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1 day.

(21) Appl. No.: 17/445,646

(22) Filed: Aug. 23, 2021

(51) Int. Cl.
  *G06F 12/00* (2006.01)
  *G06F 3/06* (2006.01)
  *G06N 20/00* (2019.01)

(52) U.S. Cl.
  CPC .......... *G06F 3/0644* (2013.01); *G06F 3/0613* (2013.01); *G06F 3/0673* (2013.01); *G06N 20/00* (2019.01)

(58) Field of Classification Search
  CPC ....... G06F 3/0629; G06F 3/0655; G06F 3/067
  See application file for complete search history.

(56) References Cited

U.S. PATENT DOCUMENTS

| | | | |
|---|---|---|---|
| 9,690,577 B1* | 6/2017 | Crew | G06F 9/541 |
| 10,572,452 B1* | 2/2020 | Singh | G06F 16/2246 |
| 2006/0136422 A1* | 6/2006 | Matveief | G06F 40/174 |
| 2011/0154378 A1* | 6/2011 | Kishan | G06F 9/4486 |
| | | | 719/331 |
| 2017/0255565 A1* | 9/2017 | Mosiolek | G06F 12/1009 |
| 2019/0114192 A1* | 4/2019 | Rao | G06F 3/0604 |
| 2020/0004441 A1* | 1/2020 | Hahn | G06F 3/0622 |
| 2020/0117598 A1* | 4/2020 | Mulani | G06F 12/0802 |
| 2021/0072921 A1* | 3/2021 | Bielby | G06F 3/0619 |
| 2021/0165736 A1* | 6/2021 | Koo | G06F 9/544 |
| 2022/0113885 A1* | 4/2022 | Jeon | G06F 3/0631 |
| 2022/0147392 A1* | 5/2022 | Choi | G06F 13/102 |

\* cited by examiner

*Primary Examiner* — Shawn X Gu
*Assistant Examiner* — Mohammad S Hasan
(74) *Attorney, Agent, or Firm* — Workman Nydegger

(57) ABSTRACT

Techniques for configuring unused memory into namespaces based on determined attributes of incoming input/output (IO). Incoming IO is analyzed to determine characteristics of the IO. Unused memory space is identified. Based on the characteristics of the IO, a portion of the unused memory space is configured into a particular namespace. This namespace is configured to handle IO having the identified characteristics. Subsequent to configuring the portion of the unused memory space into the particular namespace, a file system is created for the particular namespace. Subsequent IO, which shares the same characteristics as the IO, is routed to the namespace, which is managed using the file system.

20 Claims, 8 Drawing Sheets

CONFIGURING UNUSED SCM MEMORY SPACE TO SUPPORT NAMESPACES BASED ON IO PATTERNS

FIELD OF THE INVENTION

Embodiments of the present invention generally relate to assigning input/output (IO) to namespaces. More particularly, at least some embodiments of the invention relate to systems, hardware, software, computer-readable media, and methods for detecting IO behavior and for then configuring, based on the IO behavior, storage class memory (SCM) namespaces.

BACKGROUND

Namespaces are commonly employed as an environment to hold identifiers that may each uniquely identify an object, such as a file for example. In some cases, a namespace may take the form of a data structure that holds a mapping of lookup keys to full keys, where the full keys may include, as one of their components, a file handle or filename. Namespaces can be used in a variety of scenarios in order to store and manage data.

One scenario where namespaces can be used is in the context of storage class memory (SCM). SCM can be used in a variety of different access modes and a variety of different applications. Namespaces can be configured to provide an optimal performance environment for various workloads that are received from client applications. Unfortunately, the process of reconfiguring namespaces to handle new types of IO is a costly operation. What is needed, therefore, is an improved mechanism for handling incoming IO that are to be managed by a namespace.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
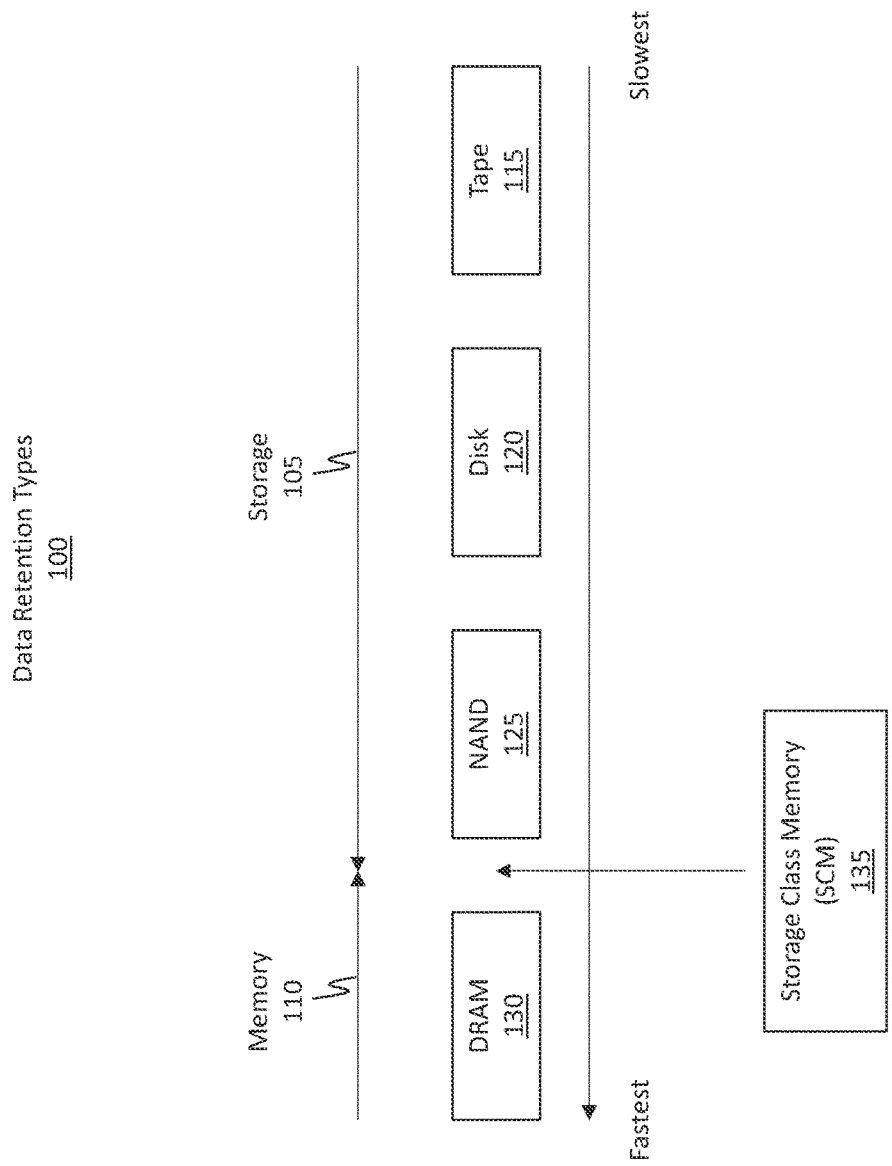
FIG. 1 illustrates different types of data retention techniques, including the use of storage class memory (SCM).

Embodiments disclosed herein relate to systems, devices, and methods for configuring unused memory into namespaces based on determined attributes of incoming input/output (IO).

In some embodiments, incoming IO is analyzed to determine one or more characteristics of the IO. The embodiments identify unused memory space that is available for configuration as one or more namespaces. Based on the characteristics of the IO, a portion of the unused memory space is configured into a particular namespace. This namespace is configured to handle IO having those characteristics. Subsequent to configuring the portion of the unused memory space into the particular namespace, the embodiments create a file system for the particular namespace. The embodiments also route subsequent IO sharing the same characteristics to the particular namespace, which is managed using the file system.

In some embodiments, a machine learning (ML) algorithm is used to analyze incoming IO. As a result of analyzing the incoming IO, one or more characteristics of the incoming IO are determined by the ML algorithm. The embodiments use the ML algorithm to estimate a future behavior of IO. The estimate of the future behavior of the IO is based on the characteristics of the incoming IO. In response to estimating the future behavior of the IO, the embodiments identify unused memory space that is available for configuration as one or more namespaces. Based on the characteristics of the IO, a portion of the unused memory space is configured into a particular namespace that is configured to handle IO having the characteristics. Subsequent to configuring the portion of the unused memory space into the particular namespace, the embodiments create a file system for the particular namespace. The embodiments also provide the particular namespace as a receptor for future IO having the one or more characteristics.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

There are a number of problems with existing technologies. For instance, there is a lengthy process of creating namespaces on an SCM memory space. Such processes involve forming the right parameters, calling a DSM interface, calling an ACPI layer, changing firmware, and even writing to hardware to finally make the changes. The operations are quite lengthy, especially if they have to be repeated based on changes to data.

Furthermore, only creating a plane namespace is also not sufficient. For instance, it is desirable to create a file system as well (e.g., for use within the namespace). Beneficially, in accordance with the disclosed principles, users will have different choices to create different file system, such as an ext3 file system, an ext4 file system, an xfs file system, and other file systems. Additionally, SCM can be configured in a byte mode or a block mode. Benefits can be achieved during the selection process by considering the IO pattern. SCM also works best when it is configured and then not later modified after the initial configuration. Indeed, reconfiguration operations will incur data loss and other compute expenses. The disclosed embodiments are designed to address these pressure points and to provide beneficial solutions.

The disclosed embodiments bring about real and substantial benefits to the technical field. Specifically, the disclosed embodiments relate to techniques for intelligently configuring namespaces based on detected IO behavior and characteristics. For instance, a first namespace can be configured or optimized to handle IO having an "x" characteristic while a second namespace can be configured or optimized to handle IO having a "y" characteristic. In this example, assume a first IO is received, where that first IO has the "x" characteristic and a second IO is received, where that second IO has the "y" characteristic. In accordance with the disclosed principles, the embodiments are able to analyze the incoming IO to determine the IOs' characteristics. Once those characteristics are determined, then the embodiments can identify unused SCM memory space and then intelligently configure one or more new namespaces that are optimized to handle IO having the detected behavior or characteristics. In this example scenario, after generating a first namespace configured to handle "x" type IO and after generating a second namespace configured to handle "y" type IO, the embodiments would forward the first IO to the first namespace and would forward the second IO to the second namespace.

Here, the system as a whole will be benefitted because the first namespace is able to readily handle and manage the first IO. The first namespace likely would not be able to handle the second IO as well as the second namespace would be able to. With that understanding, the embodiments are able to forward the second IO to the second namespace in order to capture improved performance based on configuration settings of the various namespaces. Accordingly, the disclosed embodiments introduce intelligence into how namespaces are configured.

When the disclosed operations are implemented in the context of an SCM architecture, then significant improvements in computing speed and performance can also be achieved. Furthermore, the disclosed embodiments provide a non-intrusive technique for redirecting IO to persistent memory namespaces based on resources, which process can be performed in a proportional manner relative to client needs. The embodiments can also beneficially perform various prediction techniques to predict future behavior of client applications and devices and can perform the disclosed forwarding or routing operations based on those predictions.

If attempts are made to reconfigure (using traditional techniques) the SCM to improve performance, then it is often the case that older data will be lost. Furthermore, backing up the data on a namespace for reconfiguration is a prohibitively costly operation. Additionally, traditional techniques that attempt to effectively use SCM in a specific environment also present challenging tasks. For instance, in traditional systems, IO had to be guided to the right namespace, and static tools were not available to handle such scenarios. The disclosed embodiments, on the other hand, address these issues and provide solutions to those problems. Beneficially, the embodiments are able to map incoming IO to a corresponding SCM namespace that has been configured to handle that IO. The embodiments can facilitate this mapping based on different attributes of the IO, perhaps such as block size characteristics, byte-based modes, or even block-based modes. In configuring namespaces in this manner, the embodiments promote boosts to bandwidth and reductions in latency. Accordingly, these and numerous other benefits will be described in more detail throughout the remaining portions of this disclosure.

Data Retention

Attention will now be directed to FIG. 1, which illustrates various data retention types 100 categorized as storage 105 and memory 110. Generally, storage 105 refers to techniques for persistently retaining data (e.g., non-volatile storage, such as the ability to retain data even when power is shut off) while memory 110 refers to temporary or volatile storage (e.g., data is not retained when power is shut off). The storage 105 techniques include, but certainly are not limited to, storage using physical tape 115, disk 120, and NAND 125. The memory 110 techniques include, but are not limited to, DRAM 130 (dynamic random access memory). FIG. 1 also shows the average access speeds of these different data retention techniques, where tape 115 is on the slower end and where DRAM 130 is on the faster end.

Recently, a new type of storage technique has emerged and is referred to as storage class memory (SCM) 135. SCM 135 is a type of storage technique that uses flash-based NAND. As shown in FIG. 1, SCM 135 is an intermediary between DRAM 130 and NAND 125. SCM 135 is a type of physical memory space that is implemented near the underlying computer system's central processing unit (CPU). As a consequence of being near the CPU, data can be processed very quickly and can be accessed very quickly. SCM 135 can also process data in a more granular form, such as in bytes instead of only in blocks. SCM 135 is also a form of persistent memory, so the data is retained even when power is shut off.

Namespaces

Data can be arranged in an SCM environment in various different ways. One example technique for arranging data in an SCM environment is through the use of namespaces.

Figure 2:
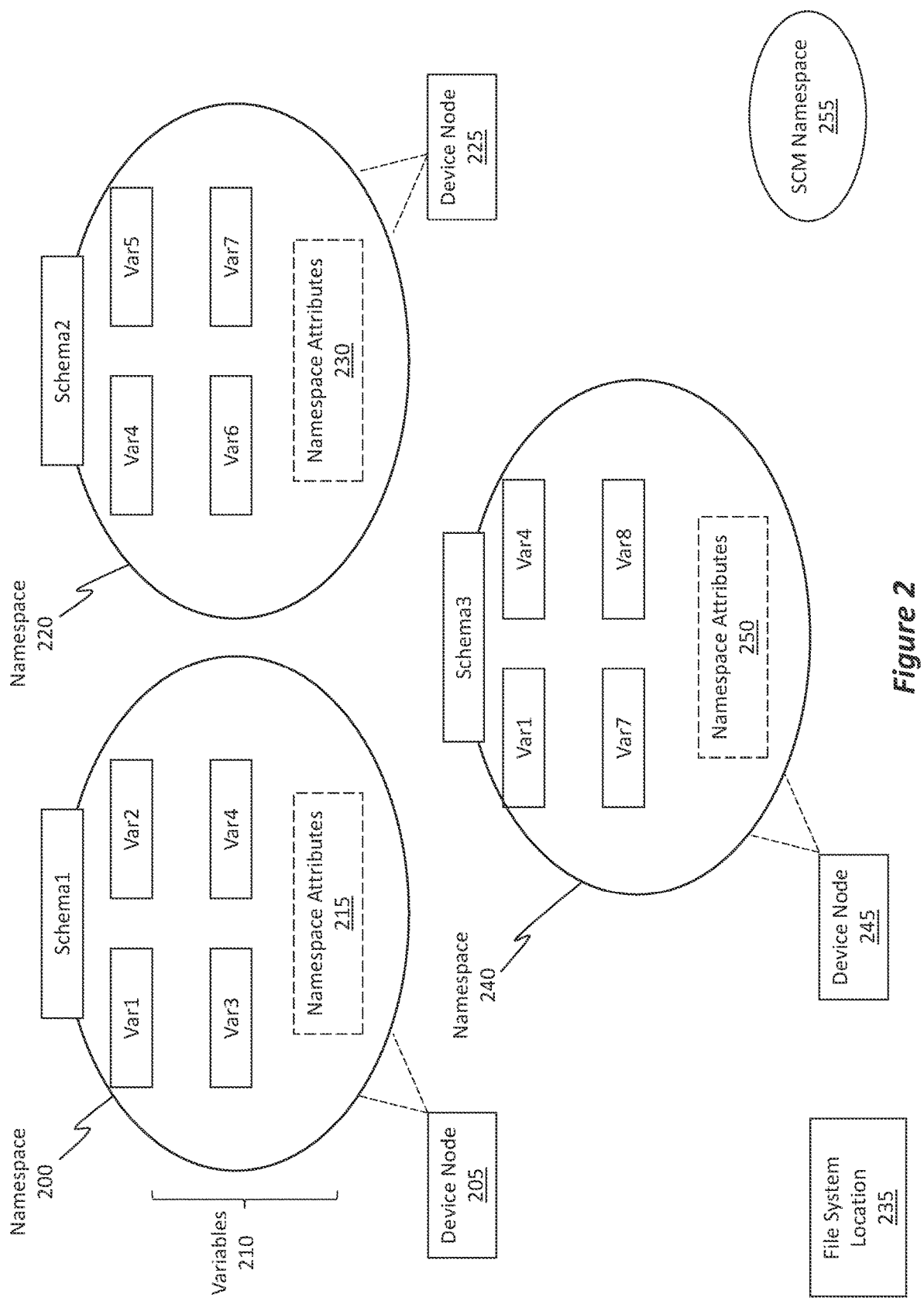
FIG. 2 illustrates how namespaces can be used to store and manage data and how those namespaces can be configured in a manner to handle different types of data.

Generally, a "namespace" refers to a declarative region or a set of signs that provide scope to a set of identifiers, such as in the case where the signs are used to differentiate and identify objects of varying kinds. Namespaces are a type of storage structure or technique that provides hierarchical organization to data that is to be stored. One benefit of namespaces relates to the ability to reuse the same naming convention in a different hierarchy. FIG. 2 is illustrative.

Figure 3:
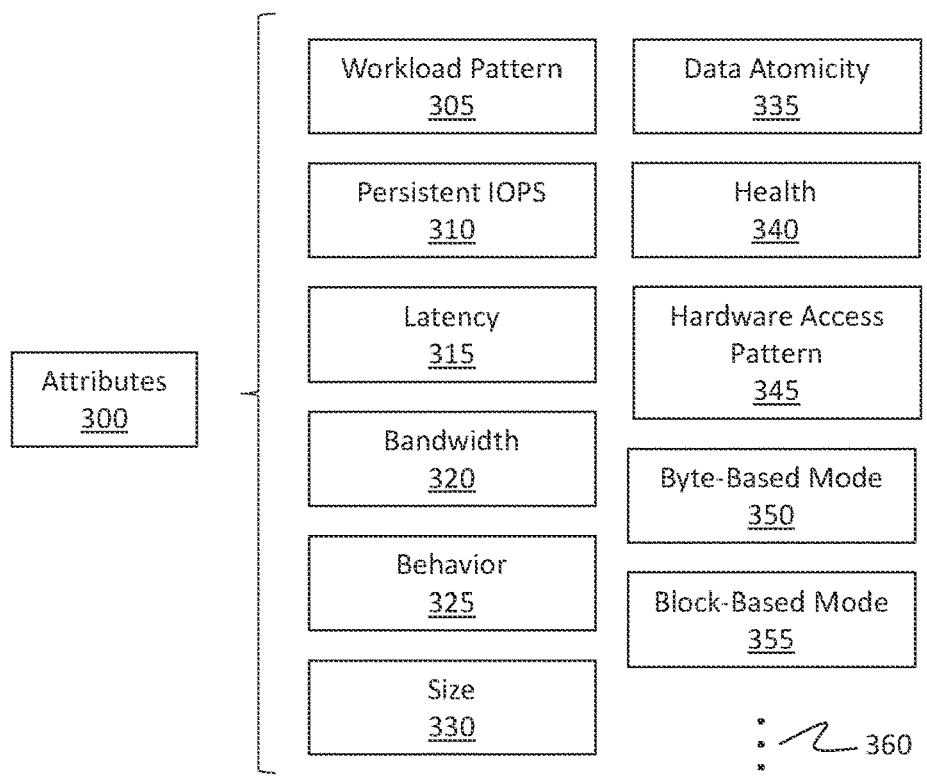
FIG. 3 illustrates various attributes associated with namespaces.

FIG. 2 shows a namespace 200 (also labeled as "Schema1") that can be mounted or located on a particular device node 205, such as a server. The namespace 200 is shown as including a number of variables 210, such as "Var1," "Var2," "Var3," and "Var4." Of course, any number of variables can be included in the namespace 200, and four is just one example. Here, the namespace 200 is configured to have various namespace attributes 215. FIG. 3 provides some additional clarification regarding the namespace attributes 215.

Specifically, FIG. 3 shows attributes 300, which are representative of the namespace attributes 215 of FIG. 2.

The attributes 300 detail characteristics, properties, or features of a namespace and potentially how that namespace is configured or for which type of IO the namespace is optimized to handle.

In FIG. 3, the attributes 300 include a workload pattern 305, a persistent input/output operations per second IOPS 310, a latency 315, a bandwidth 320, a behavior 325, a size 330, a data atomicity 335, a health 340, a hardware access pattern 345, a byte-based mode 350, and a block-based mode 355. The ellipsis 360 illustrates how other features can be included in the attributes 300.

The workload pattern 305 can describe what types of workloads or what types of workload frequencies a given namespace might be configured to handle. For instance, a namespace might be configured to support a boosted or increased amount of processing cycles during a certain time of day and have fewer cycles during other parts of the day such that increased data can be managed by the namespace during those busy time cycles as compared to the not-busy time cycles. The workload pattern 305 can reflect such timing aspects and can also reflect patterns by which workloads are received from different client applications.

The persistent IOPS 310 reflects functionality related to writing and reading operations available to a namespace or to a client application. The latency 315 reflects how long certain operations might take for a namespace and/or for a client application. The bandwidth 320 refers to how much data can be transmitted over a given time period for a namespace or client application. The behavior 325 is similar to the workload pattern 305 but provides additional details regarding the functional operations of the namespace and/or the client application. The size 330 refers to how much data a namespace is configured to handle, such as the byte size. Data can be categorized based on data atomicity 335, traffic optimized IO, health 340 (e.g., of the client device, client application, or perhaps a node hosting the namespace), and hardware access pattern 345. These features can be viewed as being static configurations of the SCM hardware. A namespace can also be configured to handle IO that is formatted or structured in a block format or in a byte format, as represented by byte-based mode 350 and block-based mode 355. In some cases, namespaces can be segregated based on the above-described characteristics or attributes 300.

As indicated previously, one of the guidelines or parameters for deciding where incoming IO should be directed to (e.g., which specific namespace) can include health (e.g., health 340) consideration-based forwarding. To illustrate, the embodiments can acquire the health of the SCM installed in a particular system. By way of example and not limitation, the embodiments can acquire this information from a "ndctl output" command. Namespaces residing on healthy SCMs can hold high priority IO. Healthy SCMs will have better performance and reliability. The health 340 can include information such as the temperature of the device node, a health status of the device node, alarm statuses, memory usage, processor usage, and so forth.

Another one of the guidelines, as reflected above, is related to traffic optimized IO forwarding. Here, a SCM system has a hardware controller that can manage traffic. The embodiments can categorize SCM that are determined to be idle. Moving IO to idle SCM can potentially optimize or improve client IO performance.

Another optional guideline relates to flush optimized forwarding. In some cases, Devdax SCM configurations can support a fast way of data movement. A particular namespace can be selected based on flushing properties of the IO stream. That is, data in the IO stream can be flushed to media, and those flushing properties can be considered when selecting or configuring a namespace. A namespace configured to consider flushing properties can beneficially reduce data commit time significantly.

Data atomicity-based forwarding is another guideline. Notably, the sector mode of a configuration can support power-fail atomicity. Customers who are more concerned about data loss can use specially configured namespaces to accommodate data atomicity requirements.

Returning to FIG. 2, namespace 220 is also illustrated. Namespace 220 is hosted or mounted on device node 225. Namespace 220 is also labeled as "Schema2" and includes the following variables: "Var4," "Var5," "Var6," and "Var7." Notice, the variable name "Var4" overlaps or is common with the "Var4" from the namespace 200. Despite this overlap, the two variables are distinct and refer to different units of data as a result of them being included in different namespaces.

A set of namespace attributes 230, such as those described in FIG. 3, are also provided for the namespace 220. The namespace attributes 230 can be different than the namespace attributes 215. Furthermore, the namespace 220 can refer to a different file system location 235 than the namespace 200.

FIG. 2 also shows namespace 240 (labeled as "Schema3"), which includes "Var1," "Var4," "Var7," and "Var8." Here, "Var1" overlaps with "Var1" in namespace 200, but those two refer to different file system locations. Similarly, "Var4" overlaps with "Var4" in both namespace 200 and namespace 220, but those three variables refer to different units of data despite the use of the common variable name.

Namespace 240 is mounted on device node 245. Furthermore, namespace 240 is associated with its own set of namespace attributes 250.

Each of the different namespaces can be configured to handle different types of data. That is, each namespace can have a configuration that is structured or "optimized" to handle a particular type or types of data/IO. Consider the following analogy. A general-purpose processor can be configured to handle essentially any type of data. An application specific integrated circuit (ASIC) or a graphics processing unit (GPU), on the other hand, are specifically programmed or configured to handle, in an efficient and optimized manner, specific types of data. Therefore, similar to how a GPU is "optimized" to handle image and video-type content, a namespace can be "optimized" to handle specific types of IO.

Figure 4:
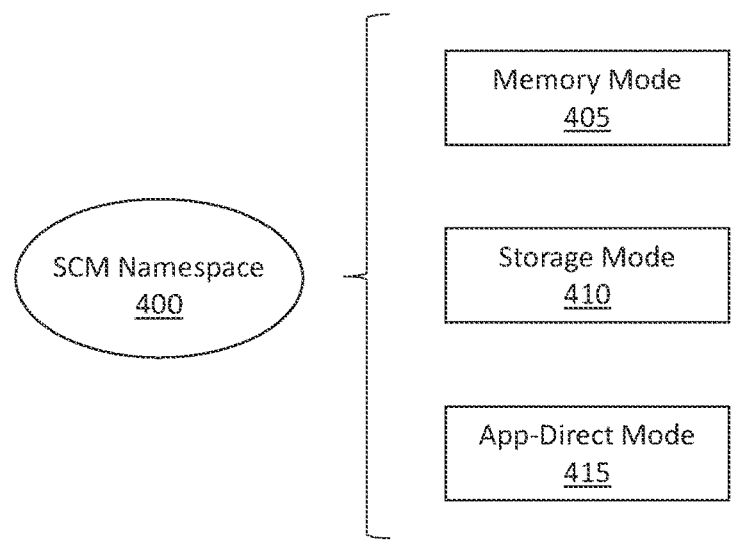
FIG. 4 illustrates various modes in which namespaces, particularly SCM namespaces, can be used.

FIG. 2 also illustrates how the namespaces 200, 220, and 240 can be a form of a SCM namespace 255. That is, those namespaces can be configured in a SCM environment. Additionally, FIG. 4 shows how the SCM namespace 400, which is representative of the namespaces mentioned thus far, can operate in different modes.

These modes include a memory mode 405, a storage mode 410, and even an app-direct mode 415. The memory mode 405 can support memory-based storage techniques, such as DRAM memory. The storage mode 410 can support storage-based techniques, such as legacy file system storage. The app-direct mode 415 is a mode explicitly exposed to applications. Accordingly, SCM namespaces are highly versatile and can be used in various different modes.

Example Architectures for Intelligently Configuring SCM Namespaces

Figure 5A:
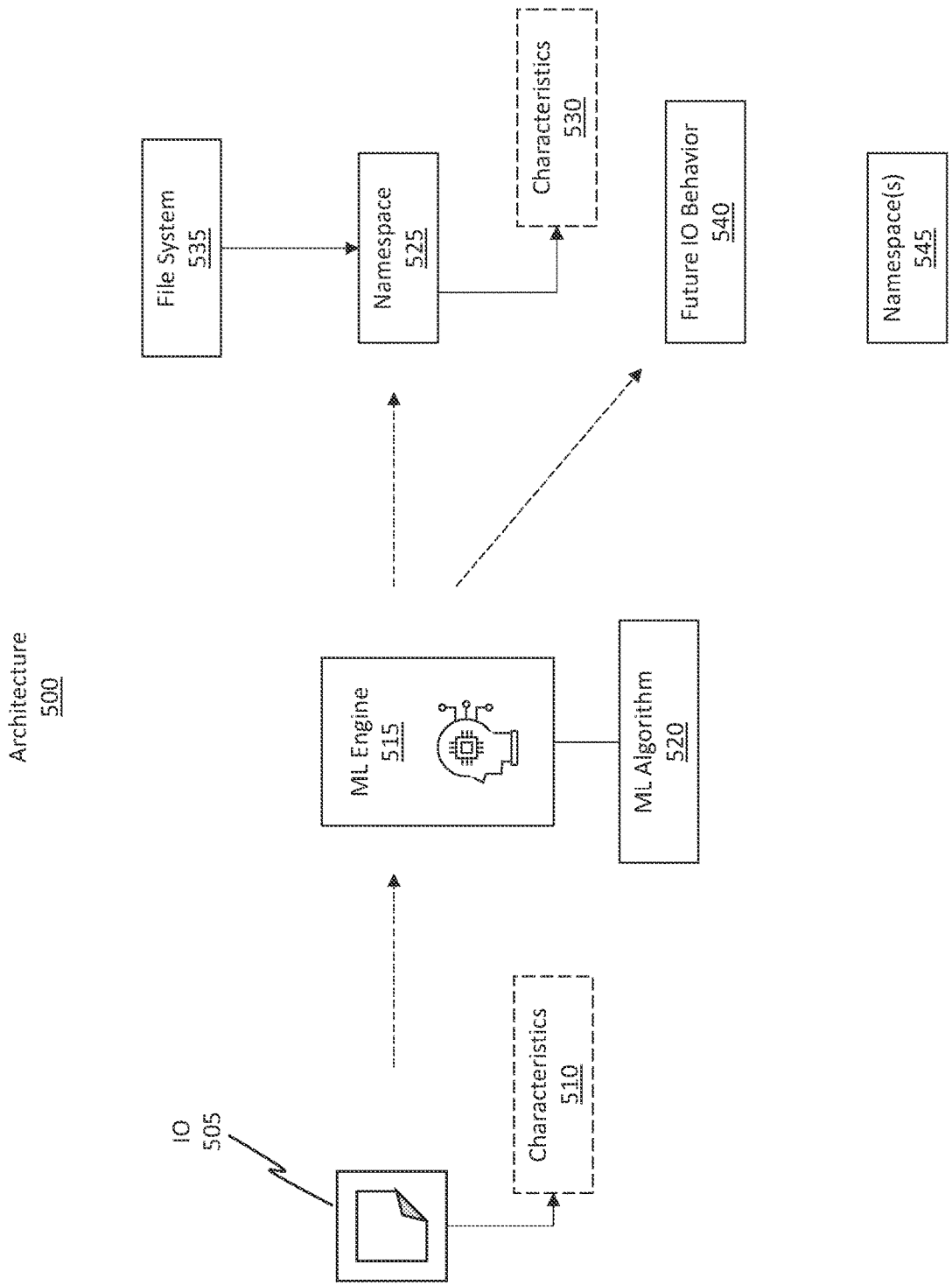
FIG. 5A illustrates an example architecture in which a machine learning (ML) engine is used to analyze input/output (IO) to determine that IO's behavior or characteristics and also to configure namespaces based on that behavior and characteristics.

FIG. 5A shows an example architecture 500 that is designed to configure unused memory into namespaces based on determined attributes of incoming IO. The architecture 500 initially shows an IO 505 that has certain characteristics 510. Although the attributes 300 of FIG. 3 were presented in connection with a namespace, those attributes 300 are also applicable or relatable to the characteristics 510. That is, the IO 505 can portray the attributes 300 of FIG. 3.

A machine learning (ML) engine 515 can analyze the IO 505 to determine, extract, or identify the characteristics 510. The ML engine 515 can include a ML algorithm 520 of any type.

As used herein, reference to "machine learning" (or ML algorithm) or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), Markov transition state or Markov chain, or any other type of intelligent computing system. Any amount of training data may be used (and perhaps later refined) to train the machine learning algorithm to dynamically perform the disclosed operations.

Figure 5B:
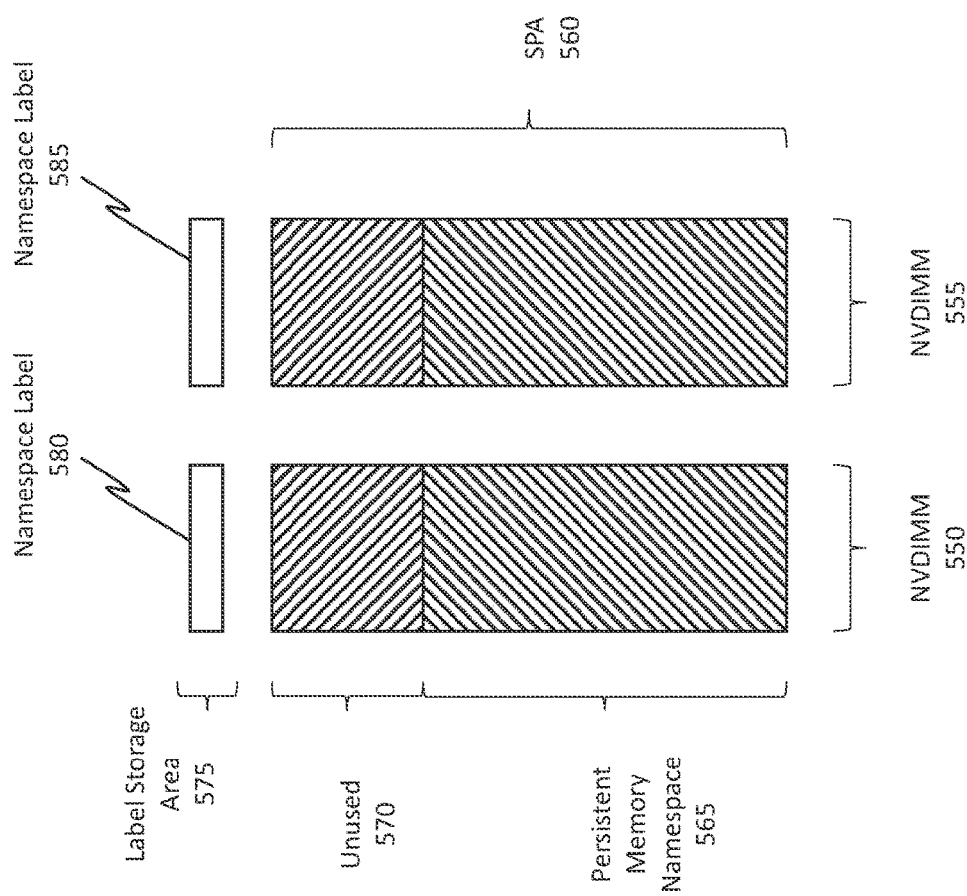
FIG. 5B illustrates how unused memory space can be used to configure new namespaces.

The ML engine 515 analyzes the IO 505 and then identifies unused memory space that is available to be configured as a namespace 525 having characteristics 530 designed to handle IO having similar characteristics as the characteristics 510. The embodiments (e.g., potentially the ML engine 515) can then also build a file system 535 in the now-configured namespace 525. The ML engine 515 can also analyze the IO 505 to determine or predict future IO behavior 540, such as how future IO will be configured (i.e. its attributes or characteristics). The embodiments can generate any number of namespace(s) 545 based on this analysis. FIG. 5B provides additional details.

FIG. 5B shows a set of SCM memory spaces in the form of NVDIMM 550 and 555 (non-volatile dual in-line memory module). The SPA 560 refers to a set of system physical addresses that are made available by the NVDIMM 550 and 555. Notice, in FIG. 5B, a portion of the SPA 560 is already used and configured, as shown by persistent memory namespace 565; however, another portion (i.e. unused 570) is not configured or in use. The architecture includes a label storage area 575, which includes a namespace label 580 and 585. The label storage area 575 can be used to configure new namespaces in the SPA 560.

In accordance with the disclosed principles, the embodiments are able to identify the unused 570 portion of the SPA 560. Based on the analysis conducted on the incoming IO, the embodiments can then configure a new namespace in the unused 570 portion of the SPA 560. This new namespace is configured to handle IO having the characteristics identified during the analysis operation. In additional to segmenting or configuring a namespace, the embodiments can also build a file system on top of the newly configured namespace, where this file system provides access to the contents stored in the namespace. Accordingly, with the architecture 500 of FIG. 5A, the embodiments can intelligently configure namespaces and file systems for use for incoming IO.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
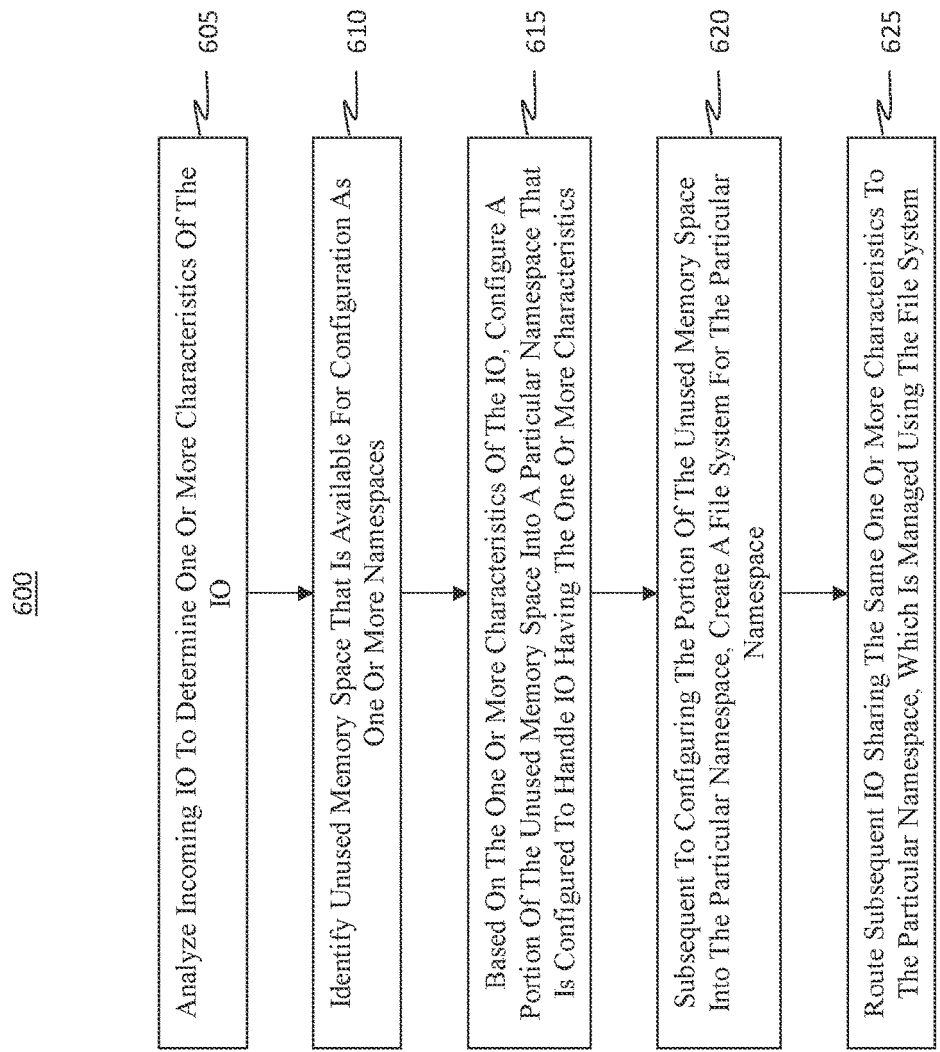
FIG. 6 illustrates a flowchart of an example method for configuring unused memory into namespaces based on determined attributes of incoming IO.

Attention will now be directed to FIG. 6, which illustrates a flowchart of an example method 600 for configuring unused memory into namespaces based on determined attributes of incoming input/output (IO). The method 600 can be performed in the architecture 500 of FIG. 5A.

Initially, method 600 includes an act (act 605) of analyzing incoming IO to determine one or more characteristics of the IO. For example, the ML engine 515 of FIG. 5A can analyze the IO 505 in order to determine the characteristics 510. The process of analyzing the incoming IO to determine the characteristics of the IO can be performed using a machine learning (ML) algorithm, and that the ML algorithm can estimate future IO behavior. The ML algorithm, which is used to perform the analysis, can be implemented using a Markov Transition State ML algorithm.

In some cases, the one or more characteristics of the IO can include a characteristics indicating that the IO has a byte-based mode or a block-based mode or any of the other attributes mentioned earlier. If the characteristics reflect a block-based mode, then the ML algorithm can further identify (and the characteristics can further indicate) a size of blocks of the IO. Example sizes include, but are not limited to 256 bytes, 512 bytes, 1024 bytes, 2048 bytes, 4 k bytes, or even more than 4 k bytes.

Act 610 involves identifying unused memory space that is available for configuration as one or more namespaces. For example, the ML engine 515 can analyze the SPA 560 of FIG. 5B to identify the unused 570 portion of the SPA 560.

Based on the one or more characteristics of the IO, there is an act (act 615) of configuring a portion of the unused memory space into a particular namespace that is configured to handle IO having the one or more characteristics. For instance, a portion of the unused 570 memory can be configured as the namespace 525 of FIG. 5A. The namespace 525 can be configured to have specific characteristics 530 that enable the namespace 525 to be optimized to handle the IO 505 having the specific characteristics 510. As an example, the namespace, which can be an SCM namespace, can be configured to manage IO having a block-based mode, a byte-based mode, or any of the other characteristics.

Subsequent to configuring the portion of the unused memory space into the particular namespace, there is an act (act 620) of creating a file system for the particular namespace. For instance, the file system 535 can be created to manage the information stored in the namespace 525. As examples only, the file system can be configured as one of an ext3 file system, an ext4 file system, or even an xfs file system. Indeed, any type of file system can be created or configured in the namespace.

Act 625 then involves routing subsequent IO (which share the same one or more characteristics) to the particular namespace, which is managed using the file system. In this manner, the embodiments can configure any number of namespaces for use by IO. Now, instead of having to reconfigure namespaces or move data around, the embodiments perform an initial configuration and then enable the configured namespaces to be used for subsequent IO.

Figure 7:
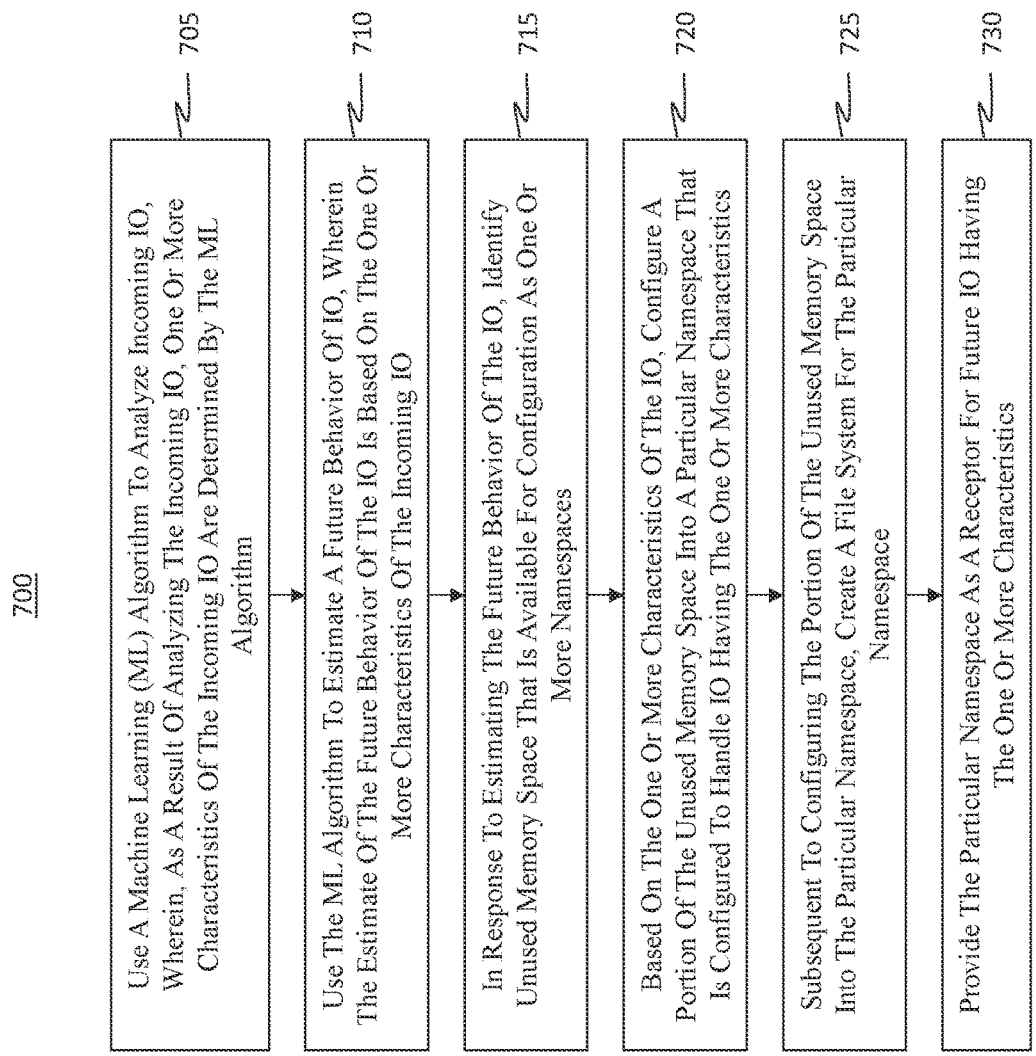
FIG. 7 illustrates another flowchart of an example method for configuring unused memory into namespaces based on determined attributes of incoming IO.

FIG. 7 illustrates another flowchart of an example method 700 for configuring unused memory into namespaces based on determined attributes of incoming input/output (IO). Act 705 involves using a machine learning (ML) algorithm to analyze incoming IO. As a result of analyzing the incoming IO, one or more characteristics of the incoming IO are determined by the ML algorithm. As discussed previously, Act 710 includes using the ML algorithm to estimate a future behavior of IO. The estimate of the future behavior of the IO is based on the one or more characteristics of the incoming IO. For instance, the estimate can include a determination that IO having certain characteristics will likely be received in the future.

In response to estimating the future behavior of the IO, act 715 includes identifying unused memory space that is available for configuration as one or more namespaces. Based on the one or more characteristics of the IO, act 720 includes configuring a portion of the unused memory space into a particular namespace that is configured to handle IO having the one or more characteristics.

Subsequent to configuring the portion of the unused memory space into the particular namespace, act 725 includes creating a file system for the particular namespace. Act 730 then includes providing the particular namespace as a receptor for future IO having the one or more characteristics. If the namespace is configured to handle byte-based IO, then the namespace can even be configured to handle IO having a particular byte size. As an example, this namespace might be configured to handle IO having a first size while a second configured namespace might be configured to handle IO having a second size.

Accordingly, the disclosed embodiments beneficially provide solutions for intelligently and dynamically identifying unused memory space and for configuring namespaces from that unused memory. These namespaces are customized or optimized to handle certain types of IO. A ML algorithm is designed to analyze incoming IO to determine the characteristics of that IO. Based on those characteristics, namespaces can be created in order to handle future IO that share similar characteristics.

Example Computer/Computer Systems

Figure 8:
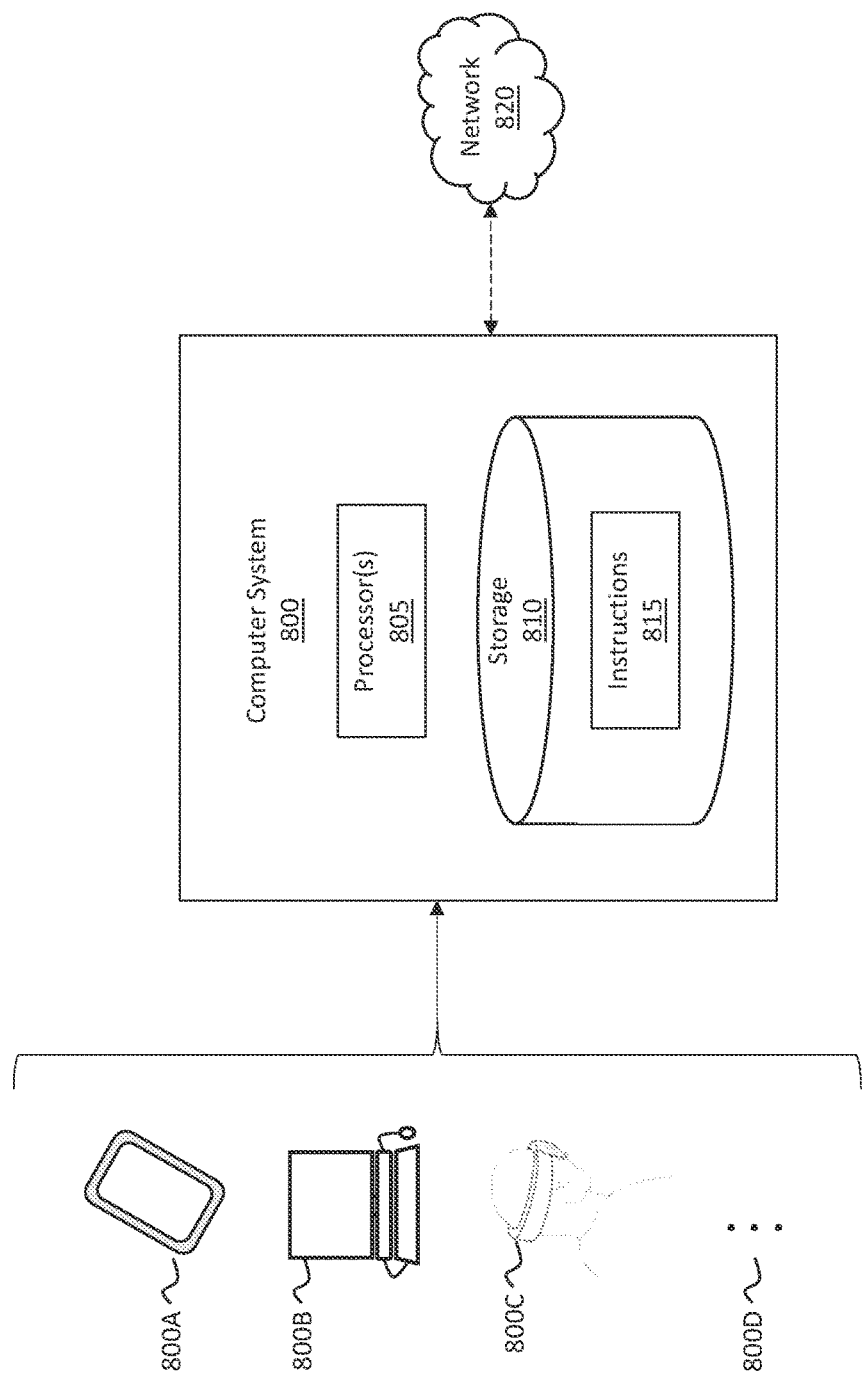
FIG. 8 illustrates an example computer system configured to perform any of the disclosed operations.

Attention will now be directed to FIG. 8 which illustrates an example computer system 800 that may include and/or be used to perform any of the operations described herein. Computer system 800 may take various different forms. For example, computer system 800 may be embodied as a tablet 800A, a desktop or a laptop 800B, a wearable device 800C, a mobile device, or any type of standalone device. The ellipsis 800D illustrates how any form factor can be used. Computer system 800 may also be a distributed system that includes one or more connected computing components/devices that are in communication with computer system 800.

In its most basic configuration, computer system 800 includes various different components. FIG. 8 shows that computer system 800 includes one or more processor(s) 805 (aka a "hardware processing unit") and storage 810.

Regarding the processor(s) 805, it will be appreciated that the functionality described herein can be performed, at least in part, by one or more hardware logic components (e.g., the processor(s) 805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" (e.g., ML engine 515 of FIG. 5A) can refer to hardware processing units or to software objects, routines, or methods that may be executed on computer system 800. The different components, modules, engines, and services described herein may be implemented as objects or processors that execute on computer system 800 (e.g. as separate threads).

Storage 810 may be physical system memory, which may be volatile, non-volatile, or some combination of the two. The term "memory" may also be used herein to refer to non-volatile mass storage such as physical storage media. If computer system 800 is distributed, the processing, memory, and/or storage capability may be distributed as well.

Storage 810 is shown as including executable instructions 815. The executable instructions 815 represent instructions that are executable by the processor(s) 805 (or perhaps even the ML engine 515 of FIG. 5A) of computer system 800 to perform the disclosed operations, such as those described in the various methods.

The disclosed embodiments may comprise or utilize a special-purpose or general-purpose computer including computer hardware, such as, for example, one or more processors (such as processor(s) 805) and system memory (such as storage 810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 800 may also be connected (via a wired or wireless connection) to external sensors (e.g., one or more remote cameras) or devices via a network 820. For example, computer system 800 can communicate with any number devices or cloud services to obtain or process data. In some cases, network 820 may itself be a cloud network. Furthermore, computer system 800 may also be connected through one or more wired or wireless networks 820 to remote/separate computer systems(s) that are configured to perform any of the processing described with regard to computer system 800.

A "network," like network 820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 800 will include one or more communication channels that are used to communicate with the network 820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

In view of the foregoing, the present invention may be embodied in multiple different configurations, as outlined above, and as exemplified by the following aspects.

1. A method for configuring unused memory into namespaces based on determined attributes of incoming input/output (IO), said method comprising:
   analyzing incoming IO to determine one or more characteristics of the IO;
   identifying unused memory space that is available for configuration as one or more namespaces;
   based on the one or more characteristics of the IO, configuring a portion of the unused memory space into a particular namespace that is configured to handle IO having the one or more characteristics;
   subsequent to configuring the portion of the unused memory space into the particular namespace, creating a file system for the particular namespace; and
   routing subsequent IO sharing the same one or more characteristics to the particular namespace, which is managed using the file system.

2. The method according to preceding Aspect 1, wherein the one or more characteristics of the IO include a characteristic indicating that the IO has a byte-based mode.

3. The method according to preceding Aspects 1 to 2, wherein the one or more characteristics of the IO include a characteristic indicating that the IO has a block-based mode.

4. The method according to preceding Aspects 1 to 3, wherein the one or more characteristics of the IO further indicate a size of blocks of the IO, which has the block-based mode.

5. The method according to preceding Aspects 1 to 4, wherein the particular namespace is configured to manage IO having a block-based mode.

6. The method according to preceding Aspects 1 to 5, wherein the particular namespace is configured to manage IO having a byte-based mode.

7. The method according to preceding Aspects 1 to 6, wherein the particular namespace is a storage class memory (SCM) namespace.

8. The method according to preceding Aspects 1 to 7, wherein the file system is configured as one of an ext3 file system, an ext4 file system, or an xfs file system.

9. The method according to preceding Aspects 1 to 8, wherein analyzing the incoming IO to determine the one or more characteristics of the IO is performed using a machine learning (ML) algorithm, and wherein the ML algorithm estimates future IO behavior.

10. The method according to preceding Aspect 9, wherein the ML algorithm is implemented using a Markov Transition State ML algorithm.

11. A method for configuring unused memory into namespaces based on determined attributes of incoming input/output (IO), said method comprising:
   using a machine learning (ML) algorithm to analyze incoming IO, wherein, as a result of analyzing the incoming IO, one or more characteristics of the incoming IO are determined by the ML algorithm;
   using the ML algorithm to estimate a future behavior of IO, wherein the estimate of the future behavior of the IO is based on the one or more characteristics of the incoming IO;
   in response to estimating the future behavior of the IO, identifying unused memory space that is available for configuration as one or more namespaces;
   based on the one or more characteristics of the IO, configuring a portion of the unused memory space into a particular namespace that is configured to handle IO having the one or more characteristics;
   subsequent to configuring the portion of the unused memory space into the particular namespace, creating a file system for the particular namespace; and
   providing the particular namespace as a receptor for future IO having the one or more characteristics.

12. The method according to preceding Aspect 11, wherein the one or more characteristics of the IO include a characteristic indicating that the IO has either a block-based mode or a byte-based mode.

13. The method according to preceding Aspects 11 to 12, wherein the ML algorithm is a Markov Transition State ML algorithm.

14. The method according to preceding Aspects 11 to 13, wherein the particular namespace is a storage class memory (SCM) namespace.

15. The method according to preceding Aspects 11 to 14, wherein the file system is configured as one or an ext3 file system, an ext4 file system, or an xfs file system.

16. The method according to preceding Aspects 11 to 15, wherein the particular namespace is configured to handle IO having a particular byte size.

17. The method according to preceding Aspects 11 to 16, wherein the particular namespace is configured to handle IO having a first size, and wherein a second namespace is configured to handle IO having a second size.

18. One or more hardware storage devices that include instructions that are executable by one or more processors of a computer system to cause the computer system to at least:
analyze incoming IO to determine one or more characteristics of the IO;
identify unused memory space that is available for configuration as one or more namespaces;
based on the one or more characteristics of the IO, configure a portion of the unused memory space into a particular namespace that is configured to handle IO having the one or more characteristics;
subsequent to configuring the portion of the unused memory space into the particular namespace, create a file system for the particular namespace; and
route subsequent IO sharing the same one or more characteristics to the particular namespace, which is managed using the file system.

19. The one or more hardware storage devices according to preceding Aspect 18, wherein a Markov Transition State machine learning (ML) algorithm analyzes the incoming IO.

20. The one or more hardware storage devices according to preceding Aspects 18 to 19, wherein the one or more characteristics of the IO include a byte-based mode or a block-based mode.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring unused memory into namespaces based on determined attributes of incoming input/output (IO), said method comprising:
analyzing incoming IO to determine one or more characteristics of the IO;
identifying unused memory space that is available for configuration as one or more namespaces;
based on the one or more characteristics of the IO, configuring a portion of the unused memory space into a particular namespace that is configured to handle IO having the one or more characteristics;
subsequent to configuring the portion of the unused memory space into the particular namespace, creating a file system for the particular namespace; and
routing subsequent IO sharing the same one or more characteristics to the particular namespace, which is managed using the file system.

2. The method of claim 1, wherein the one or more characteristics of the IO include a characteristic indicating that the IO has a byte-based mode.

3. The method of claim 1, wherein the one or more characteristics of the IO include a characteristic indicating that the IO has a block-based mode.

4. The method of claim 3, wherein the one or more characteristics of the IO further indicate a size of blocks of the IO, which has the block-based mode.

5. The method of claim 1, wherein the particular namespace is configured to manage IO having a block-based mode.

6. The method of claim 1, wherein the particular namespace is configured to manage IO having a byte-based mode.

7. The method of claim 1, wherein the particular namespace is a storage class memory (SCM) namespace.

8. The method of claim 1, wherein the file system is configured as one of an ext3 file system, an ext4 file system, or an xfs file system.

9. The method of claim 1, wherein analyzing the incoming IO to determine the one or more characteristics of the IO is performed using a machine learning (ML) algorithm, and wherein the ML algorithm estimates future IO behavior.

10. The method of claim 9, wherein the ML algorithm is implemented using a Markov Transition State ML algorithm.

11. A method for configuring unused memory into namespaces based on determined attributes of incoming input/output (IO), said method comprising:
using a machine learning (ML) algorithm to analyze incoming IO, wherein, as a result of analyzing the incoming IO, one or more characteristics of the incoming IO are determined by the ML algorithm;
using the ML algorithm to estimate a future behavior of IO, wherein the estimate of the future behavior of the IO is based on the one or more characteristics of the incoming IO;
in response to estimating the future behavior of the IO, identifying unused memory space that is available for configuration as one or more namespaces;
based on the one or more characteristics of the IO, configuring a portion of the unused memory space into a particular namespace that is configured to handle IO having the one or more characteristics;
subsequent to configuring the portion of the unused memory space into the particular namespace, creating a file system for the particular namespace; and
providing the particular namespace as a receptor for future IO having the one or more characteristics.

12. The method of claim 11, wherein the one or more characteristics of the IO include a characteristic indicating that the IO has either a block-based mode or a byte-based mode.

13. The method of claim 11, wherein the ML algorithm is a Markov Transition State ML algorithm.

14. The method of claim 11, wherein the particular namespace is a storage class memory (SCM) namespace.

15. The method of claim 11, wherein the file system is configured as one or an ext3 file system, an ext4 file system, or an xfs file system.

16. The method of claim 11, wherein the particular namespace is configured to handle IO having a particular byte size.

17. The method of claim 11, wherein the particular namespace is configured to handle IO having a first size, and wherein a second namespace is configured to handle IO having a second size.

18. One or more hardware storage devices that include instructions that are executable by one or more processors of a computer system to cause the computer system to at least:
- analyze incoming IO to determine one or more characteristics of the IO;
- identify unused memory space that is available for configuration as one or more namespaces;
- based on the one or more characteristics of the IO, configure a portion of the unused memory space into a particular namespace that is configured to handle IO having the one or more characteristics;
- subsequent to configuring the portion of the unused memory space into the particular namespace, create a file system for the particular namespace; and
- route subsequent IO sharing the same one or more characteristics to the particular namespace, which is managed using the file system.

19. The one or more hardware storage devices of claim 18, wherein a Markov Transition State machine learning (ML) algorithm analyzes the incoming IO.

20. The one or more hardware storage devices of claim 18, wherein the one or more characteristics of the IO include a byte-based mode or a block-based mode.

* * * * *